(12) United States Patent
Christie et al.

(10) Patent No.: US 6,714,221 B1
(45) Date of Patent: Mar. 30, 2004

(54) DEPICTING AND SETTING SCROLL AMOUNT

(75) Inventors: Gregory N. Christie, San Jose, CA (US); Nick King, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 364 days.

(21) Appl. No.: 09/632,379

(22) Filed: Aug. 3, 2000

(51) Int. Cl.[7] .............................................. G06F 13/00
(52) U.S. Cl. ...................................... 345/784; 345/787
(58) Field of Search ................................ 345/784, 785, 345/786, 787, 973

(56) References Cited

U.S. PATENT DOCUMENTS

| | | | | |
|---|---|---|---|---|
| 5,528,260 A | * | 6/1996 | Kent ........................... | 345/684 |
| 5,530,455 A | * | 6/1996 | Gillick et al. ................ | 345/163 |
| 5,872,566 A | * | 2/1999 | Bates et al. .................. | 345/786 |
| 6,252,594 B1 | * | 6/2001 | Xia et al. ..................... | 345/786 |

OTHER PUBLICATIONS

Stephen L. Nelson & Peter Weverka, Microsoft Office 97—The Complete Reference, Jun. 1997, Chapter 7, pp. 1–5.*

Microsoft Corporation, "Microsoft IntelliMouse Support in Visual FoxPro 5.0", Visual FoxPro Technical Articles, Oct. 1996, pp. 1–5.*

Microsoft Windows 98, Copyright 1997.*

* cited by examiner

*Primary Examiner*—Cao (Kevin) Nguyen
(74) *Attorney, Agent, or Firm*—Blakely, Sokoloff, Taylor & Zafman LLP (57) ABSTRACT

A user interface and methods for controlling and presenting information concerning scrolling of an on-screen document are described. In one aspect of the invention, an exemplary method of the invention generates a graphical user interface to provide functionality of controlling a scroll amount for an on-screen document. In this method, a graphical representation of a scroll activator is displayed to enable the user to activate the scroll function using a cursor control device. In addition, a graphical representation of multiple scroll amount indicators is also displayed along with the graphical representation of the scroll activator. The multiple scroll amount indicators graphically illustrate various magnitudes of scrolling. According to another aspect of the present invention, an exemplary method of the invention provides a coasting function when an on-screen document scrolls. This exemplary method includes detecting a user interaction with a scrolling device, determining that the coasting function is in an enabled state, scrolling the on-screen document while detecting the user interaction, detecting that the user interaction ended, and then continuing to scroll the on-screen document after detecting that the user interaction ended. The user interaction with the scrolling device may end at any portion of the scrolling device. Other aspects of the present invention relating to controlling scrolling of the on-screen document are also described.

42 Claims, 8 Drawing Sheets

DEPICTING AND SETTING SCROLL AMOUNT

FIELD OF THE INVENTION

The present invention relates to the field of controlling a scroll function in a digital processing system. In particular, the present invention relates to controlling and presenting information pertaining to scrolling of an on-screen document.

INTRODUCTION AND BACKGROUND

A user interface is the means by which a user interacts with a digital processing system, such as a computer system. Known user interfaces utilize windows in conjunction with a cursor control device. The cursor control device, commonly a mouse, trackball, or stylus device, is used to position a cursor in a window. The cursor control device typically includes a switch (e.g., a mouse button) having at least two positions for generating signals to the computer to indicate a selection or other action by a user. The window typically includes a data display area to display viewable data such as, for example, text documents, spreadsheets, sound and video objects.

When a document or other data that is being displayed within the window is larger than the data display area or the window, some of the data is "hidden". This "hidden" data can be brought into the data display area through scrolling. Scrolling refers to moving the data/document in a user-defined direction in order to bring "hidden" portions within the data display area. Known window interfaces provide different methods for scrolling. One method is to provide predetermined scroll areas where scrolling can be invoked; e.g., scroll bars, scroll arrows or scroll boxes. Using this method, the user positions the cursor in the scroll area and a switch associated with the cursor control device is placed in a predetermined position or clicked. Scrolling will occur in a direction and manner associated with the particular scroll area. A second method is to initiate scrolling whenever the computer system detects that a cursor is on or near the edge of the window and a switch associated with the cursor control device is in a predetermined position. Scrolling will then occur in a corresponding direction of the window edge detected. A third known method, primarily used in application software, allows a user to select an icon from a function palette, to enable the cursor to control movement of the data within the window in a corresponding fashion. This action is analogous to moving a flat piece of paper around on a desk with one's hand.

Common user interfaces allow the user to control the scroll amount. The scroll amount represents how much of an on-screen document scrolls when triggered by a user interaction with the cursor control device. However, known user interfaces are limited to textual methods for depicting and adjusting the scroll amount. Specifically, a user interface typically either provides an input field where the user may specify the desired scroll amount (e.g., a number of lines to be scrolled upon the user's movement of the cursor control device) or a "pop-up" or pull down menu to display a list of several options for the scroll amount. While these textual methods of depicting the scroll amount may be an acceptable way of presenting this information, the lists or menus may not be easily alterable and the alteration operations are not intuitive. Thus, it is desirable to provide a more psycho-physically meaningful and visually communicative method of graphically depicting and adjusting the scroll amount of an on-screen document.

Further, known scrolling methods do not provide a coasting function when various cursor control devices are used to scroll an on-screen document. The coasting function allows the user to continue scrolling the document after the user interaction with the cursor control device has ended. Some existing scrolling methods provide a coasting feature only when a trackpad device is used to scroll the on-screen document. In addition, this coasting feature is not triggered unless the user interaction with the trackpad ends at a certain portion of the trackpad. Thus, it is desirable to provide an improved scrolling functionality with a coasting feature available with use of any cursor control device.

SUMMARY OF THE INVENTION

The present invention relates to various aspects for controlling and presenting information concerning scrolling of an on-screen document.

In one aspect of the invention, an exemplary method of the invention generates a graphical user interface to provide functionality of controlling a scroll amount for an on-screen document. In this method, a graphical representation of a scroll activator is displayed to enable the user to activate the scroll function using a cursor control device. In addition, multiple scroll amount indicators are also displayed along with the graphical representation of the scroll activator. The multiple scroll amount indicators graphically illustrate various magnitudes of scrolling. In one typical example of this method, a slider may be placed in a position that corresponds to one of the multiple scroll amount indicators to adjust the scroll amount for the on-screen document. In this example, the scroll amount represents how much of the on-screen document scrolls when triggered by a user interaction with the cursor control device. In one embodiment, an animated cue is displayed to illustrate a change in the scroll amount when the slider is placed in a new position.

According to another aspect of the present invention, an exemplary method of the invention provides a coasting function when an on-screen document scrolls. This exemplary method includes detecting a user interaction with a scrolling device, determining that the coasting function is in an enabled state, scrolling the on-screen document while detecting the user interaction, detecting that the user interaction ended, and then continuing to scroll the on-screen document after detecting that the user interaction ended. The user interaction with the scrolling device may end at any portion of the scrolling device. In one typical example of this method, the scrolling device is disposed on a mouse, and the user interaction with the scrolling device includes rolling a scrolling wheel of the scrolling device. In one embodiment, after the end of the user interaction with the scrolling device is detected, the speed of scrolling the on-screen document is gradually reduced until the on-screen document no longer scrolls. In an alternate embodiment, in which the coasting function is set to a lock setting, after the end of the user interaction with the scrolling device is detected, the on-screen document continues to scroll until a user command to stop scrolling is received. The user command to stop scrolling may, for example, be triggered by a user tapping the scrolling device.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION

The present invention provides methods and apparatuses for controlling and presenting information concerning the scrolling of an on-screen document. In the following description, numerous specific details are set forth in order to provide a through understanding of the present invention. It will be obvious, however, to one skilled in the art that the present invention may be practiced without these specific details. In other instances, well-known control structures and coding techniques have not been shown in detail in order not to unnecessarily obscure the present invention.

Hardware Overview

Figure 1:
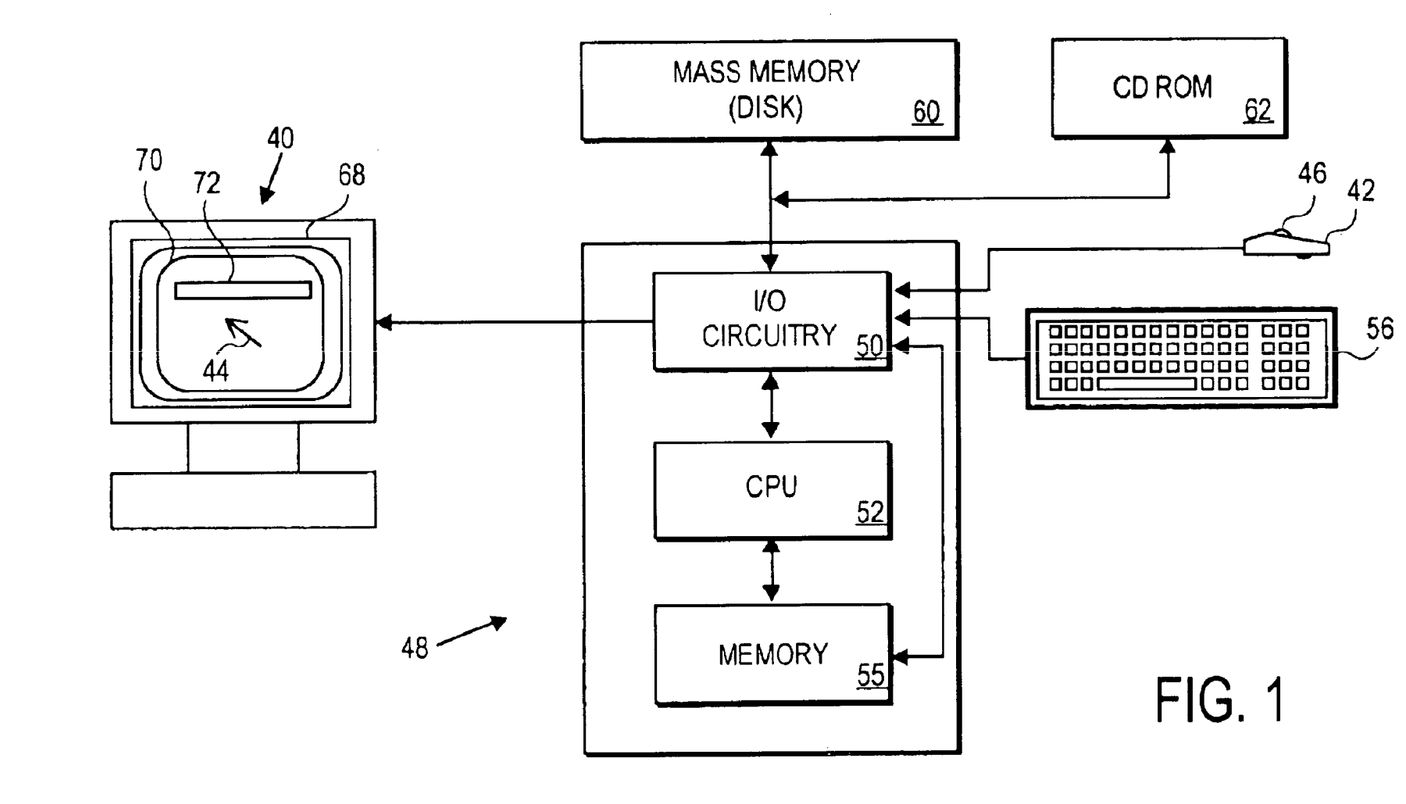
FIG. 1 is a block diagram of a digital processing system in which scrolling functionality is provided, in accordance with one embodiment of the present invention.

FIG. 1 is a block diagram of a digital processing system in which scrolling functionality may be provided, in accordance with one embodiment of the present invention. The digital processing system includes a display means 40, such as a CRT monitor or a liquid crystal display (LCD), a plasma display, or other type of display device. The digital processing system further includes a cursor control device 42, such as a mouse, a track ball, joy stick, touchpad or other device for selectively positioning a cursor 44 on a display screen 68 of the display 40. Typically, the cursor control device 42 includes a signal generation means, such as a switch 46 (e.g., a mouse button, a mouse wheel, etc.) having a first position and a second position. The user of the digital processing system may use the switch 46 to generate signals directing the system to execute certain commands. As illustrated, the cursor control device 42 is coupled to a computer system 48.

The computer 48 comprises an input/output (I/O) circuit 50 which is used to communicate information in appropriately structured form to and from other portions of the computer 48. In addition, the computer 48 includes a central processing unit (CPU) 52 coupled to the I/O circuit 50 and a memory 55. These elements are those typically found in most general purpose computers, and in fact, computer 48 is intended to be representative of a broad category of data processing devices capable of generating graphic displays.

Also shown in FIG. 1 is a keyboard 56 to input data and commands into the computer 48, as is well known in the art. A magnetic mass memory disk 60 is shown coupled to I/O circuit 50 to provide additional storage capability for the computer 48. In addition, a CD ROM 62 is further coupled to the I/O circuit 50 for additional storage capacity. It will be appreciated that additional devices may be coupled to the computer 48 for storing data, such as magnetic tape drives, as well as networks, which are in turn coupled to other data processing systems.

As illustrated in FIG. 1, the display 40 includes the display screen 68 in which a window 70 is displayed. As is well known in the art, the window 70 may be in the form of a rectangle or other well known shape, and may include a menu bar 72 disposed horizontally across the length of the window. As is well known, the movement of the cursor control device 42 may be translated by the computer 48 into movement of the cursor 44 on the display screen 70. The system illustrated in FIG. 1 is intended to represent a general digital processing system capable of providing a graphic user interface display. It will be appreciated that the digital processing system represents only one example of a system, which may have many different configurations and architectures, and which may be employed with the present invention. In operation, the window based user interface of the present invention is generated and displayed using software stored in memory 55 and executed by the CPU 52, as is known.

Controlling Scroll Amount

Figure 2:
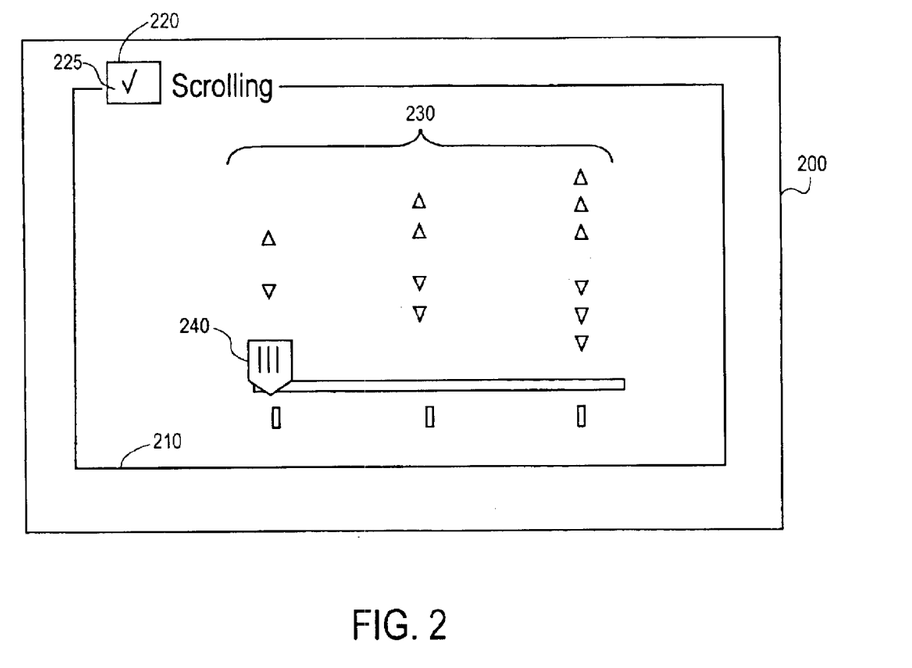
FIG. 2 shows a GUI (graphical user interface), and in particular, a scroll function display window for displaying and controlling a scroll amount for an on-screen document, according to one embodiment of the invention.

FIG. 2 shows a graphical user interface (GUI), and in particular, a scroll function display window for displaying and controlling a scroll amount for an on-screen document, according to one embodiment of the invention. The scroll function display window 210, which may be one of several windows displayed on a display screen 200, includes a display area for controlling a scroll function. As shown in FIG. 2, the scroll function window 210 includes a graphical representation of a scroll activator and multiple scroll amount indicators 230. The scroll activator enables the user to activate the scroll function using a cursor control device. In one embodiment, the scroll amount activator is a checkbox 220. In this embodiment, the user may position a cursor on the checkbox 220 using the cursor control device and set a switch on the cursor control device into a predetermined position to make a checkmark 225 appear (or alternatively disappear) in the checkbox 220. In one embodiment, the user positions the cursor on the checkbox 220 using a mouse and then "clicks" the checkbox 220 by depressing and releasing a mouse button to make the checkmark 225 appear or disappear in the checkbox 220. The checkmark 225 indicates that the scroll function is in an enabled state.

The multiple scroll amount indicators 230 illustrate various magnitudes of scrolling. A magnitude of scrolling, also referred to as a scroll amount, represents how much of the on-screen document scrolls when triggered by a user movement of a scrolling device. The scroll amount may be characterized by a number of scroll units where each scroll unit represents a certain number of lines. In one embodiment, each of the multiple scroll amount indicators 230 is depicted by one or more arrows illustrating various magnitudes of scrolling. For example, the scroll amount indicator illustrated by one arrow may correspond to the smallest scroll amount and the scroll amount indicator illustrated by three arrows may correspond to the largest scroll amount. The arrows may also depict the direction of scrolling a document, e.g., whether the scrolling is performed towards the bottom or the top of the document.

In one embodiment, the scroll function window 210 also provides a slider 240 to allow the user to select or change the scroll amount. In this embodiment, each scroll amount indicator 230 corresponds to a certain position on the slider 240. When the user wishes to select a new scroll amount or adjust an existing scroll amount, the user uses the cursor control device to position the slider 240 in a position corresponding to a desired scroll amount indicator. In one embodiment, the user places a cursor on the slider 240 using a mouse, and keeps the cursor on the slider 240 while depressing a mouse button and moving the slider to the desired position and then releases the button. Subsequently, the digital processing system uses the position of the slider 240 to determine the scroll amount for scrolling on-screen documents. In one embodiment, an animated cue is displayed to illustrate the change when the user sets a new scroll amount. One embodiment of the animated cue will be described in greater detail below in conjunction with FIG. 4.

Figure 3:
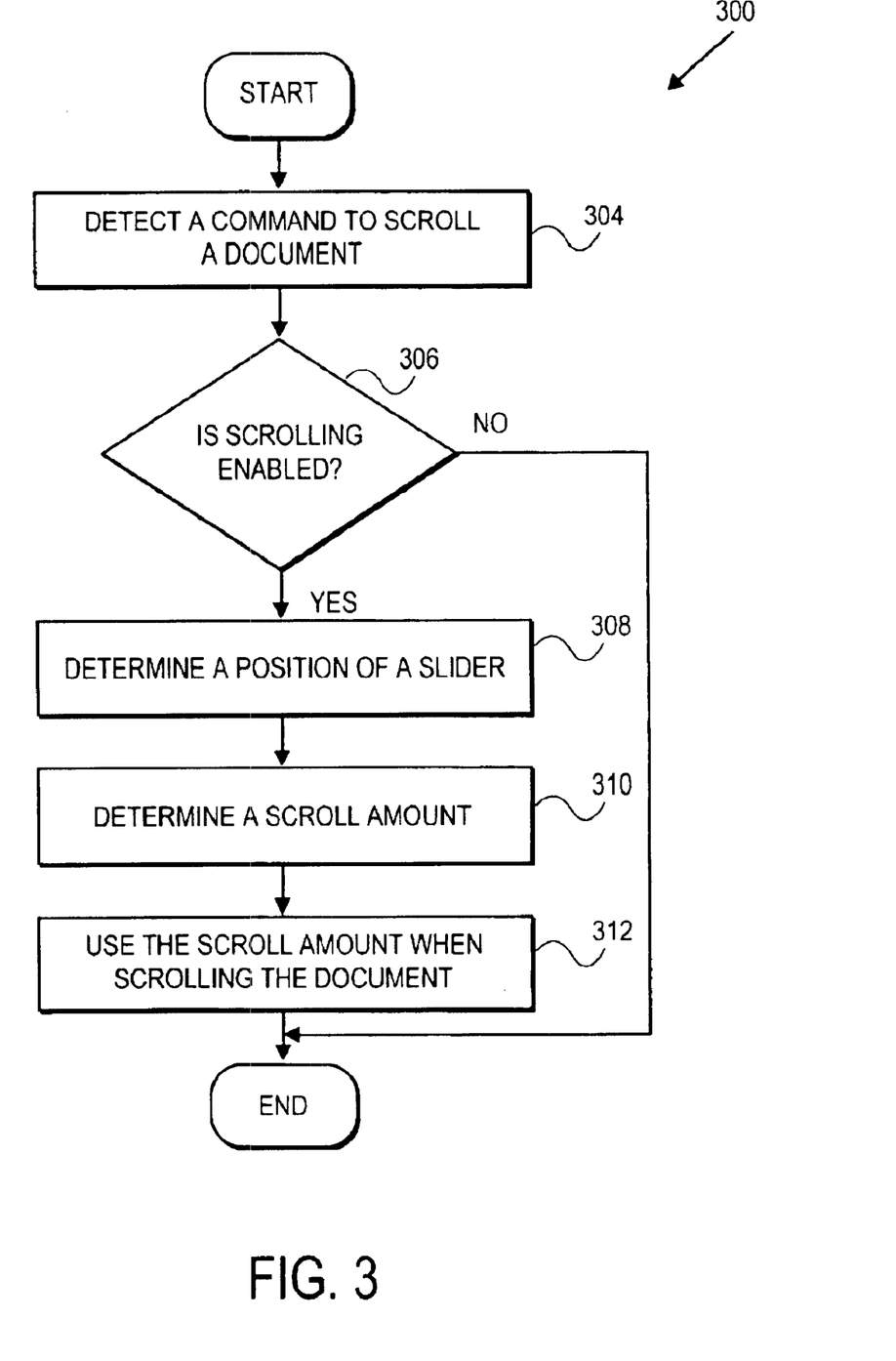
FIG. 3 is a flow diagram of a method for scrolling an on-screen document using a user-defined scroll amount, according to one embodiment of the invention.

FIG. 3 is a flow diagram of a method 300 for scrolling an on-screen document using a user-defined scroll amount, according to one embodiment of the invention.

At block 304, a command to scroll the document is detected. In one embodiment, in which a scroll bar is provided in a display window, the command to scroll the document is triggered when the user positions a cursor on the scroll bar using a cursor control device (e.g., a mouse), places a switch of the cursor control device (e.g., a button) in a predetermined position (e.g., by depressing the button), and begins interacting with the cursor control device (e.g., by moving the mouse), while keeping the switch in the predetermined position, to cause the cursor to be moved in a direction corresponding to a desired scrolling direction.

At decision box 306, a determination is made as to whether the scrolling function is enabled. The determination is made using a scroll activator information provided by the user via the scroll function window 210 of FIG. 2. In one embodiment, the determination is made depending on whether the checkmark 225 appears in the checkbox 220. If the scrolling function is disabled, no scrolling can be performed and flow passes back to block 304. Otherwise, if the scrolling function is enabled, flow passed to block 308, at which a position of a slider is determined.

At block 310, a scroll amount is determined. The scroll amount is determined based on the position of the slider. As described above, the slider's position corresponds to a particular scroll amount which may be measured using scroll units. In one embodiment, the scroll amount may depend on an application program performing scrolling. One embodiment of determining the scroll amount by various application programs will be described in more detail in conjunction with FIG. 5.

At block 312, the determined scroll amount is used to scroll the on-screen document. In one embodiment, the scrolling of the document using the determined scroll amount continues until the end of the document is reached or until the command to scroll the document is no longer detected. In an alternate embodiment, in which a coasting feature is provided, scrolling the document may continue even after the scroll command is interrupted and is no longer detected. The coasting feature will be described in greater detail below.

Figure 4:
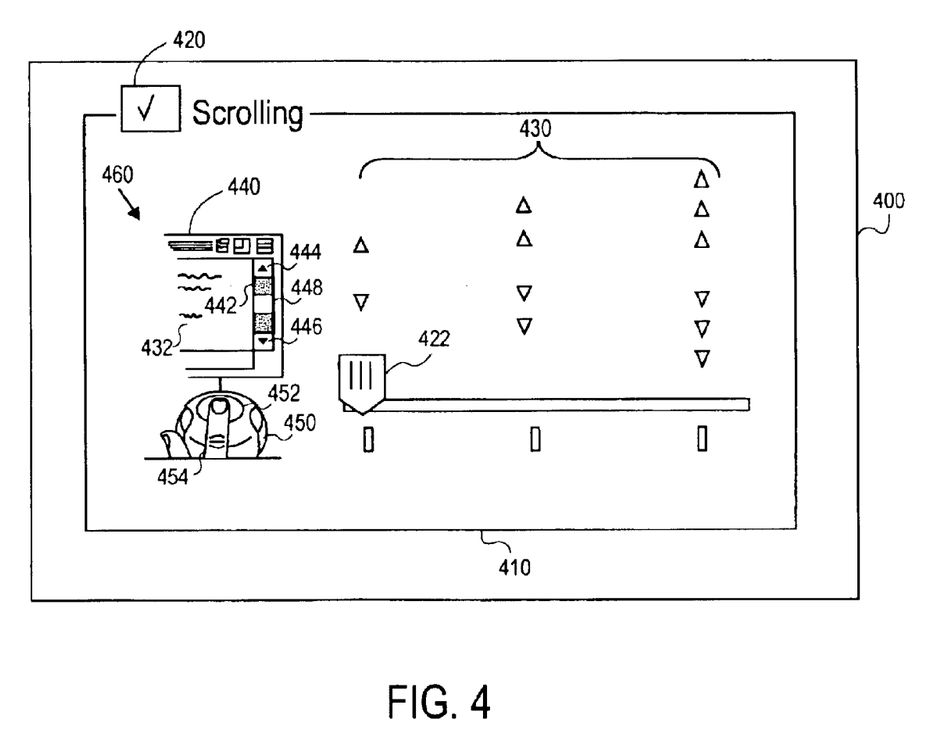
FIG. 4 shows an example of a GUI displaying an animated cue for illustrating a change in a scroll amount, according to one embodiment of the invention.

FIG. 4 shows an example of a GUI displaying an animated cue for illustrating a change in a scroll amount, according to one embodiment of the invention. The animated cue 460 is provided in a scroll function window 410 which may be one of multiple windows displayed in a display area 400. Similarly to the scroll function window 210 of FIG. 2, the scroll function window 410 illustrated in FIG. 4 includes a scroll activator 420 indicating whether the scroll function is enabled, multiple scroll amount indicators 430 and a slider 422. As described above, the slider 422 may be selectively placed in a position corresponding to a certain scroll amount that is illustrated by one of the multiple scroll amount indicators 430.

Additionally, the scroll function window 410 displays the animated cue 460 which illustrates how the scroll amount changes when the slider 422 is placed in a different position. The animated cue 460 shows a graphic representation of the document to be scrolled and a cursor control device. The graphic representation of the document illustrates a part of the document 432 included in a display window 440. The display window 440 also includes a vertical scroll bar 442, a vertical scroll box 448, an up scroll arrow 444 and a down scroll arrow 446. The cursor control device is shown as a mouse 450 having a wheel 452 as a scrolling device. A finger 454 is placed on the scrolling device 452 to show the user interaction with the scrolling device 452.

In one embodiment, illustration of the finger 454 is animated and coordinated with a change in the position of the slider 422. That is, when the slider is moved to a new position, a movement of the finger 454 on the scrolling device 452 is displayed followed by displaying the scrolling of the document 432 to illustrate how much of the document 432 scrolls upon the movement of the finger 454 on the scrolling device 452. The scrolling of the document 432 corresponds to a new scroll amount set by the user.

Figure 5:
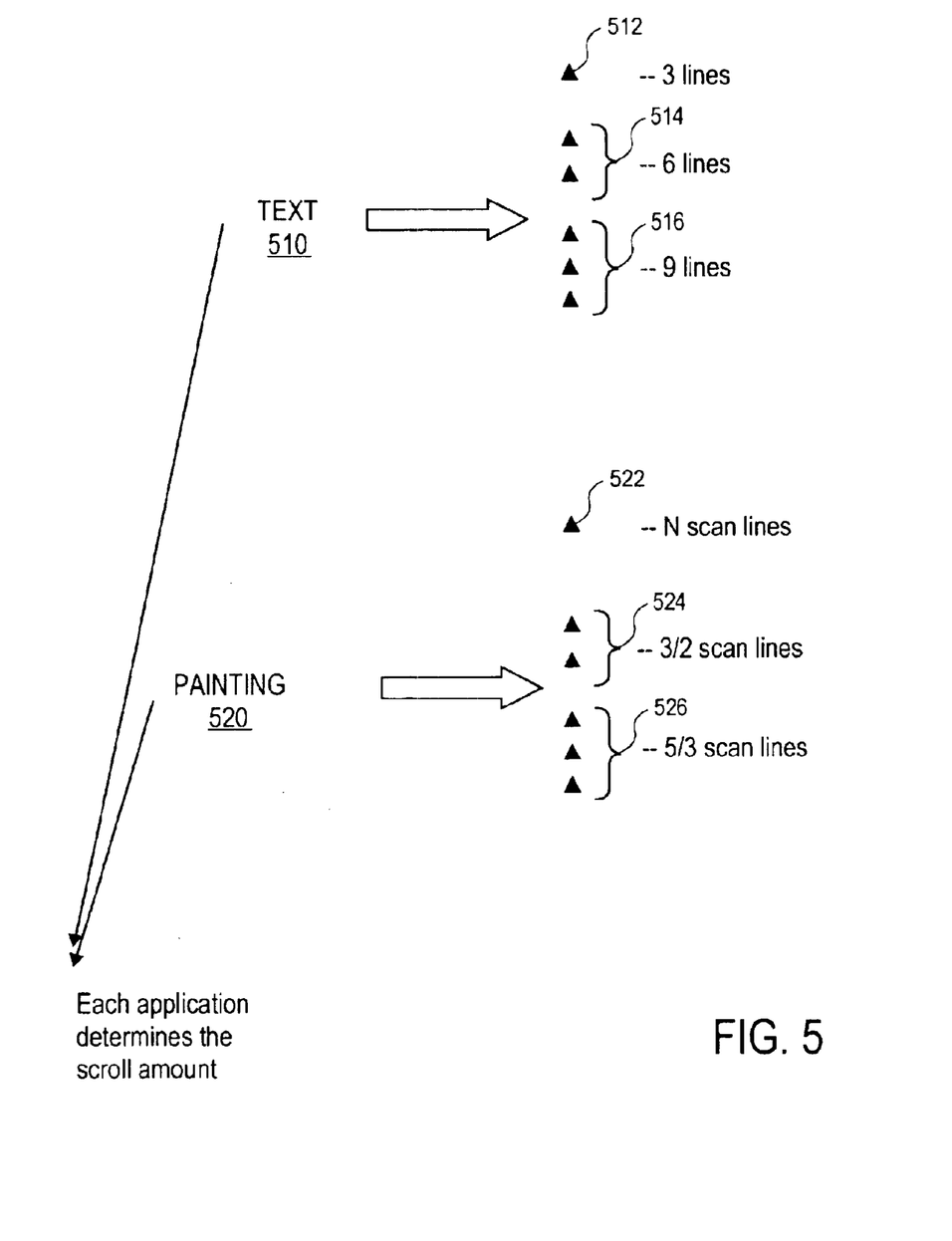
FIG. 5 illustrates a determination of a scroll amount by an application program, according to one embodiment of the invention.

FIG. 5 illustrates a determination of a scroll amount by an application program, according to one embodiment of the invention. In this embodiment, the multiple scroll amount indicators 230 of FIG. 2 represent corresponding scroll amounts. Each of the scroll amounts may contain different numbers of scroll units depending on various application programs using the scroll amount.

Referring to FIG. 5, two exemplary application programs are shown. The first application program, a text program 510, provides various functions pertaining to text files. The second application program, a painting program 520, provides various functions pertaining to image files. Both the text program 510 and the painting program 520 associate each of the scroll amount indicators 230 of FIG. 2 with a certain predetermined scroll amount. For instance, the text program 510 may associate a scroll amount indicator 512 with a scroll amount of 3 lines, a scroll amount indicator 514 with a scroll amount of 6 lines and a scroll amount indicator 516 with a scroll amount of 9 lines. That is, if the slider 240 of FIG. 2 is set to a position corresponding to a scroll amount indicator depicted by one arrow, the text program 510, upon detecting a command to scroll the document, will scroll 3 lines of the document when triggered by a user movement of a scrolling device. Similarly, if the slider 240 is set to a position corresponding to a scroll amount indicator depicted by two arrows, the text program 510 will scroll 9 lines of the document when triggered by the user movement of the scrolling device.

In one embodiment, the painting program 520 may associate the scroll amount indicators 230 with the same scroll amounts as the text program 510. In another embodiment, shown in FIG. 5, the painting program 520 associates the scroll amount indicators 230 with the scroll amounts different from those used by the text program 510. For example, the painting program 520 may associate a scroll amount indicator 522 with a scroll amount of N scan lines, a scroll amount indicator 524 with a scroll amount of 3/2 N scan lines and a scroll amount indicator 526 with a scroll amount of 5/3 N scan lines. Accordingly, if the slider 240 is set to a position corresponding to a scroll amount indicator depicted by one arrow, the painting program 520 will scroll N scan lines of the image when triggered by the user movement of the scrolling device. It should be noted that the shown application programs are merely exemplary, and a wide variety of other application programs may use scroll amounts in the manner described above. Similarly, the scroll amounts are shown only to illustrate the described concept, and any possible combinations of various scroll amounts can be used by application programs when scrolling on-screen documents.

Coasting Function

As described above, if the scrolling function is activated, scrolling of the document begins when a command to scroll the document is detected and continues until the end of the document is reached or until the command to scroll the document is no longer detected. The command to scroll the document is detected as long as the user keeps the switch of a cursor control device in a predetermined position. For instance, if the cursor control device is a mouse, the command is detected when the user depresses a button and while the user keeps the button depressed. When the scrolled document is large, going from its first page to a page close to the end of the document may take a noticeable amount of time. If during this time, the user incidentally releases the button, the scrolling stops, and the user must re-initiate scrolling in order to get to a desired page, thereby slowing down scrolling and causing inconvenience to the user. The coasting feature makes the scrolling process fast and convenient to the user by allowing the user to continue scrolling the document after the user interaction with the cursor control device has ended.

Figure 6:
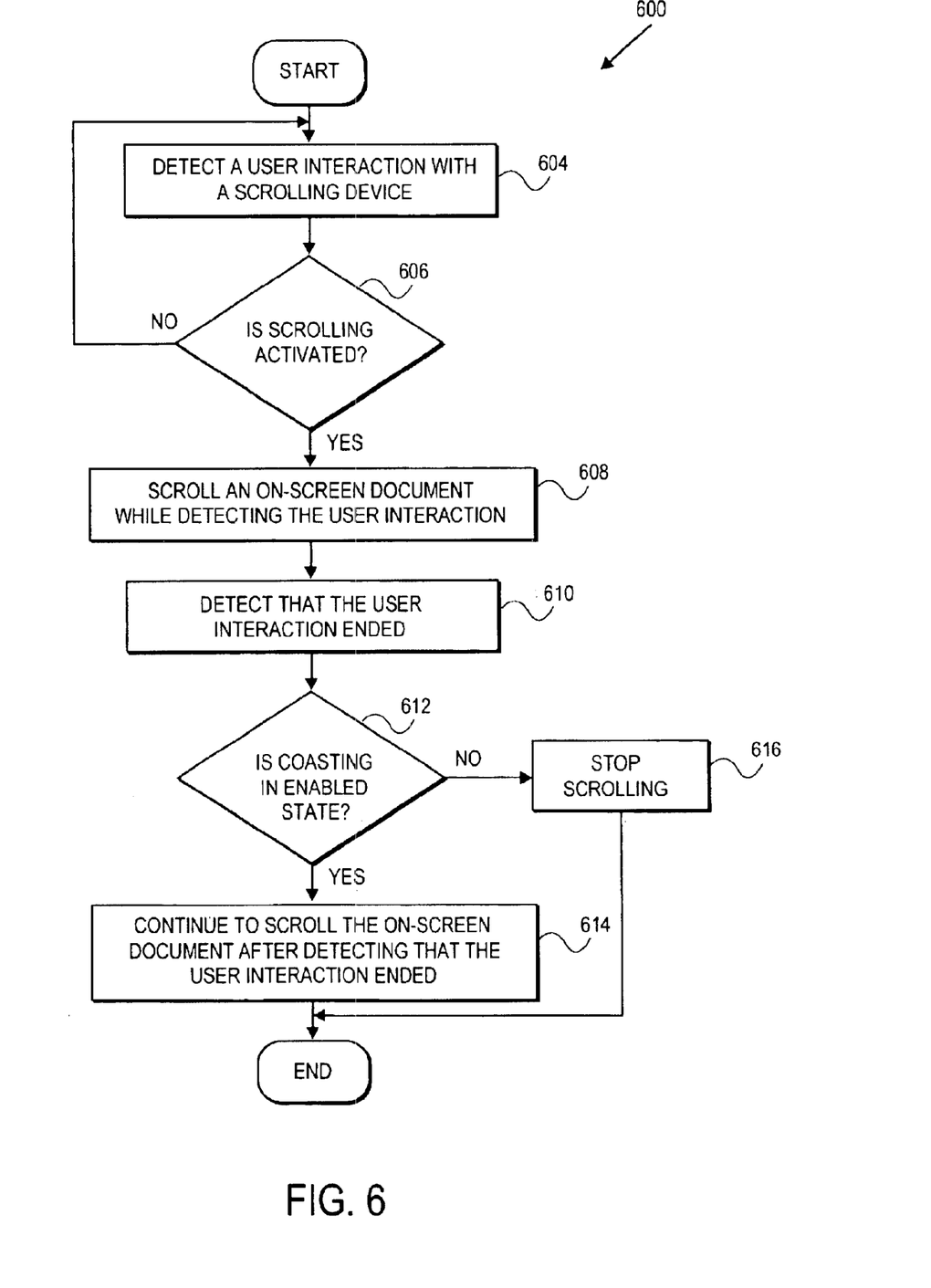
FIG. 6 is a flow diagram of a method for triggering a coasting function when scrolling an on-screen document, according to one embodiment of the invention.

FIG. 6 is a flow diagram of a method 600 for triggering a coasting function when scrolling an on-screen document, according to one embodiment of the invention.

At block 604, a user interaction with a scrolling device is detected. The user interaction with the scrolling device includes setting a switch associated with the scrolling device in a predetermined position as described above. For instance, the user interaction may include depressing a mouse button, rolling a scrolling wheel of the mouse, sliding a finger over a trackpad or touchpad device, etc. In one embodiment, the scrolling device is a dedicated scrolling device. The dedicated scrolling device is a device dedicated exclusively to scrolling. That is, the operating system assigns to the dedicated scrolling device a single task of supporting the scrolling function. Dedicated scrolling devices may include, for example, a wheel, a joystick, a touchpad, etc.

At block 606, a determination is made as to whether the scrolling function is activated. In one embodiment, the determination is made based on a state of a scrolling activator such as the scrolling checkbox 220 of FIG. 2. If the scrolling activator is disabled, flow passes back to block 604. Otherwise, flow passes to block 608, at which an on-screen document scrolls while the user interaction is being detected.

Next, at block 610, it is detected that the user interaction with the scrolling device has ended. The user may end the interaction by releasing the button, by stopping to roll the wheel, by finishing to slide the finger over the touchpad; etc. In one embodiment, the user may end to interact with the scrolling device at any portion of the scrolling device, i.e., the user does not need to end the interaction at a particular portion of the scrolling device in order to trigger the coasting function.

At decision box 612, a determination is made as to whether the coasting function is in an enabled state. In one embodiment, a GUI is provided to enable activation of the coasting function by the user. The GUI is described in greater detail in conjunction with FIG. 8. If it is determined that the coasting function has not been activated, the scrolling of the on-screen document stops (block 616). Otherwise, if the coasting function has been activated, the coasting function is triggered and flow passes to block 614.

At block 614, the coasting function causes the on-screen document to continue scrolling even though it was determined at block 610 that the user interaction with the scrolling device ended.

Figure 7:
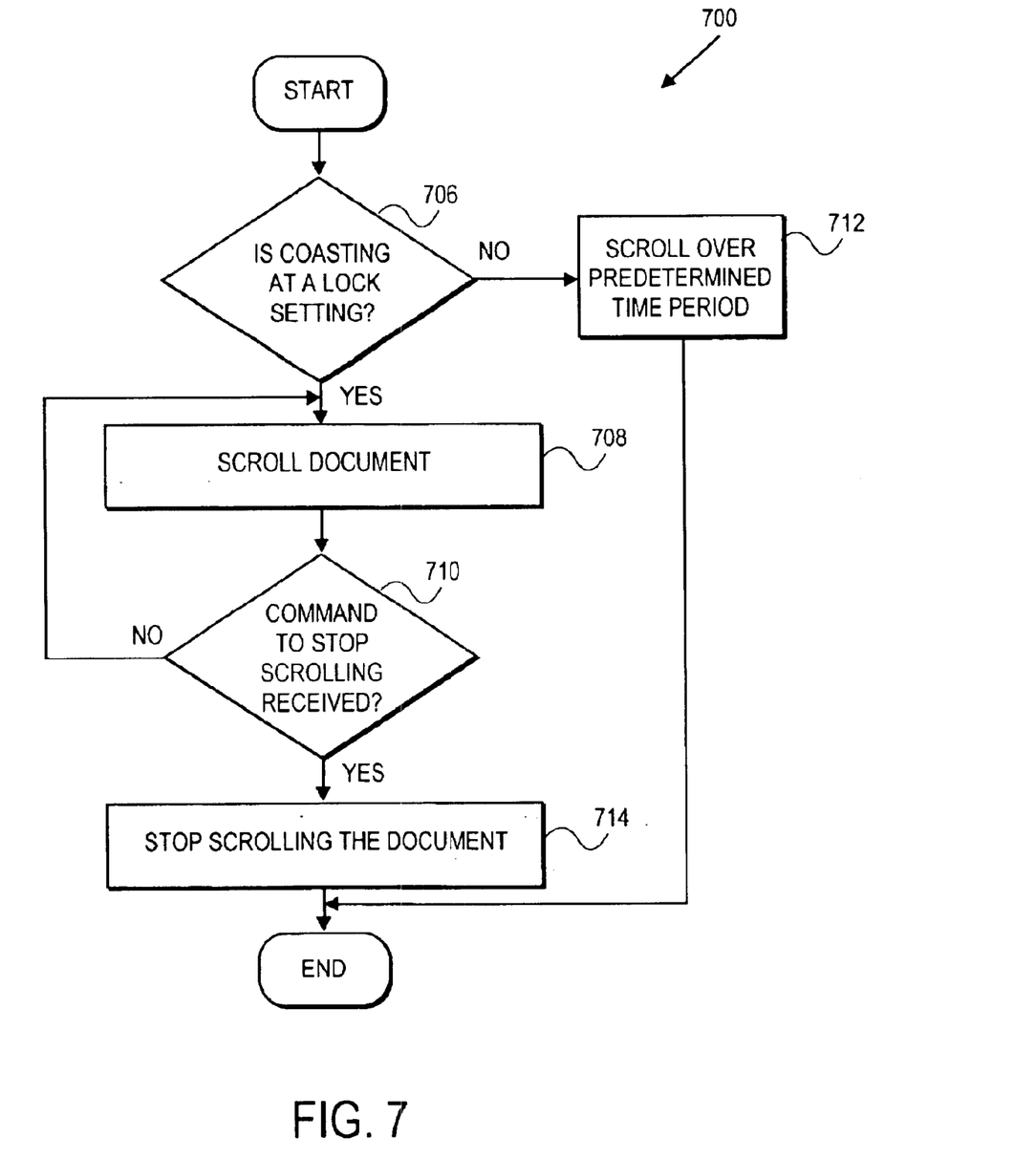
FIG. 7 is a flow diagram of a method for continuing scrolling an on-screen document after triggering a coasting function as illustrated in FIG. 6, according to one embodiment of the invention.

The operation of the scrolling function will now be described in more detail. FIG. 7 is a flow diagram of a method 700 for continuing to scroll an on-screen document upon triggering a coasting function as illustrated in FIG. 6, according to one, embodiment of the invention.

Referring to FIG. 7, the operation of the coasting function begins at decision box 706 where a determination is made as to whether the coasting function is at a lock setting. In one embodiment, a GUI is provided to allow the user to select either a lock setting or a certain time period for scrolling. If the coasting function is not at the lock setting, flow passes to block 712, at which the scrolling continues over a predetermined time period. In one embodiment, the predetermined time period may be specified by the user via the GUI which will be described in more detail below in conjunction with FIG. 8. Alternatively, the predetermined time period may be defined programmatically. In one embodiment, the speed of scrolling gradually reduces during this predetermined time period until the document no longer scrolls. As a result, the document coasts, "organically" decaying in its speed, until the predetermined time period expires.

Otherwise, if at block 706 the determination is made that the coasting function is at the lock setting, flow passes to block 708. At block 708, the on-screen document continues to scroll. Next, at decision box 710, a determination is made as to whether a user command to stop scrolling is received. In one embodiment, the user command to stop scrolling is triggered by a user tapping the scrolling device (e.g., slightly depressing and then releasing a button or a wheel of the mouse). If the user command to stop scrolling is not received, flow passes back to block 708. Otherwise, flow passes to block 714, at which the scrolling of the document ends.

Figure 8:
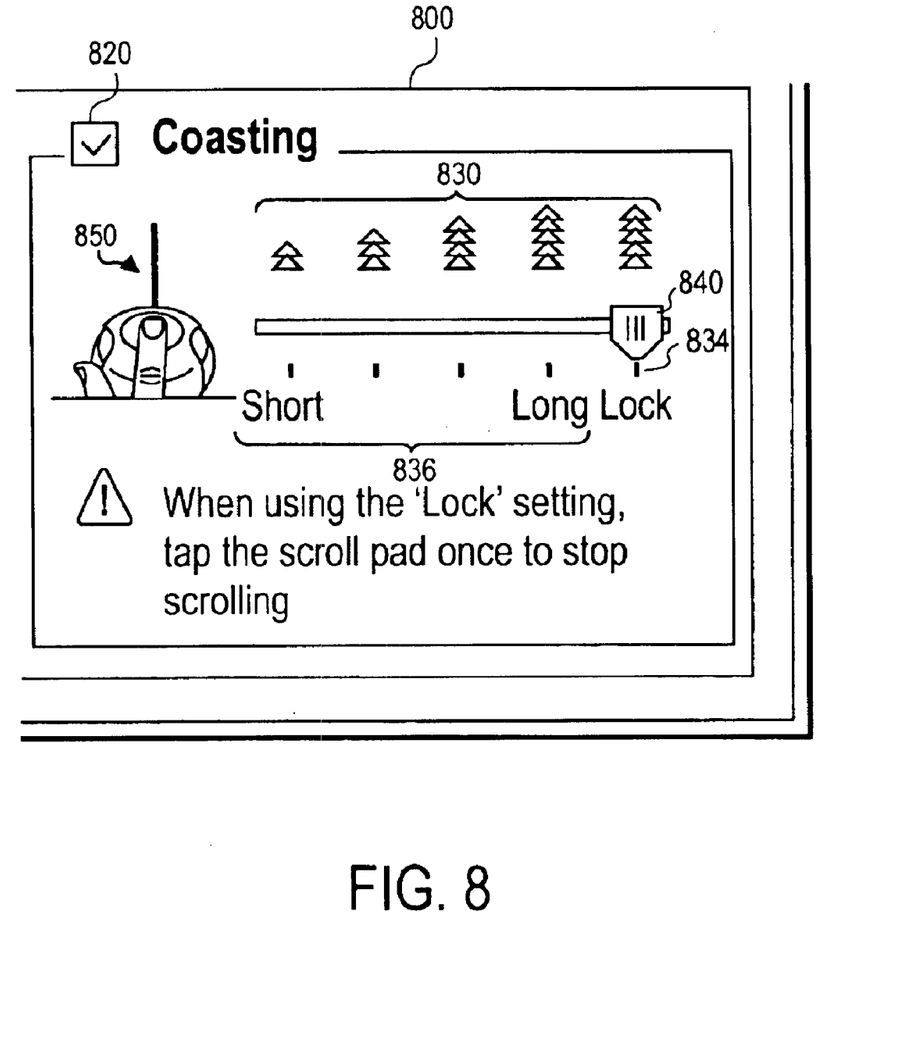
FIG. 8 shows a GUI, and in particular, a coasting scroll function display window for displaying and controlling a coasting function for scrolling, according to one embodiment of the invention.

FIG. 8 shows a GUI, and in particular, a coasting scroll function display window for displaying and controlling a coasting function for scrolling, according to one embodiment of the invention. The coasting function display window 410, which may be one of several windows displayed on a display screen 800, includes a checkbox 820, multiple scrolling indicators 830 and a slider 840. The user may activate or deactivate the coasting function using the checkbox 820. When a checkmark appears in the checkbox 820, the coasting function is in an enabled stated. Otherwise, the coasting function is in a disabled state.

The scrolling indicators 830 illustrate various time intervals for scrolling triggered by the coasting function. In one embodiment, the scrolling indicators 830 are depicted by one or more arrows. The more arrows the scroll indicator has, the longer the document will continue to scroll after the user interaction with the scrolling device ends.

The slider 840 allows the user to select a certain setting for the coasting function. Each setting corresponds to a certain scrolling time indicator. A lock setting 834 activates a lock feature. The lock feature allows the user who no longer interacts with the scrolling device to continue scrolling the document until the user issues a command to stop scrolling. In one embodiment, the command to stop scrolling is triggered by the user tapping the scrolling device. For instance, when the user wants to activate the lock feature, the user positions the slider 834 at the lock setting 834. Subsequently, when the user scrolls a long document using, for example, a mouse wheel, and then releases the wheel, the scrolling continues until a desired page is displayed and the user taps the wheel to stop scrolling.

When the user does not wish to activate the lock feature, the user may position the slider 840 at any of the settings 836. The settings 836 allow the user to continue scrolling for a certain time period without interacting with the scrolling device. In one embodiment, when the slider is positioned at one of the settings 836, the speed of scrolling will gradually reduce until the document no longer scrolls. That is, the scrolling will "fade" over a time period set in the slider 840 as illustrated by arrows of scrolling time indicators associated with the settings 836.

In one embodiment, the coasting function window 810 also includes an animated cue 850 to illustrate how the coasting function operates when the position of the slider 840 changes.

Thus, a user interface and methods for controlling and presenting information concerning scrolling of an on-screen document have been described. While the invention has been described in terms of several embodiments and illustrative figures, those skilled in the art will recognize that the invention is not limited to the embodiments or figures described. Therefore, it should be understood that the method and apparatus of the invention can be practiced with modification and alteration within the spirit and scope of the appended claims. The description is thus to be regarded as illustrative instead of limiting on the invention.

What is claimed is:

1. A method for generating a graphical user interface to a user, said graphical user interface to provide functionality of controlling a scroll amount for an on-screen document, said method comprising:

displaying a representation of a scroll activator to enable the user to activate the scroll function using a cursor control device; and displaying a plurality of images representing scroll amount indicators, the plurality of images graphically illustrating various magnitudes of scrolling that correspond to a set of distinct scroll amounts, wherein the scroll amount indicators are used for a plurality of application programs and the set of distinct scroll amounts is capable of being configured differently for each of the plurality of application programs.

2. The method of claim 1 wherein the scroll amount represents how much of the on-screen document scrolls when triggered by a user interaction with the cursor control device and wherein said method further comprises:

displaying one of a plurality of windows on a display, the window including a display area for controlling a scroll function; and selectively positioning a slider in a position corresponding to one of the plurality of scroll amount indicators, the slider is being positioned using the cursor control device controlled by the user.

3. The method of claim 2 wherein each of the plurality of scroll amount indicators illustrates a direction of scrolling a document.

4. The method of claim 1 wherein each of the plurality of scroll amount indicators is depicted by one or more arrows illustrating a magnitude of scrolling.

5. The method of claim 1 further comprising displaying an animated cue to illustrate a change in the scroll amount.

6. The method of claim 5 wherein displaying an animated cue comprises:

displaying a finger placed on a scrolling device;

displaying at least a portion of a representation of a document to be scrolled;

displaying a selection of said change in the scroll amount;

displaying a movement of the finger on the scrolling device; and displaying a scrolling of the representation of the document to illustrate how much of the document scrolls upon the movement of the finger, the scrolling amount corresponding to said change in the scroll amount.

7. A machine readable medium having stored thereon executable code which causes a machine to perform a method for generating a graphical user interface for display, said graphical user interface to provide functionality of controlling a scroll amount for an on-screen document, said method comprising:

displaying a representation of a scroll activator to enable the user to activate the scroll function using a cursor control device; and displaying a plurality of images representing scroll amount indicators, the plurality of images graphically illustrating various magnitudes of scrolling that correspond to a set of distinct scroll amounts, wherein the scroll amount indicators are used for a plurality of application programs and the set of distinct scroll amounts is capable of being configured differently for each of the plurality of application programs.

8. The machine-readable medium of claim 7 wherein the scroll amount represents how much of the on-screen document scrolls when triggered by a user interaction with the cursor control device and wherein said method further comprises:

displaying one of a plurality of windows on a display, the window including a display area for controlling a scroll function; and selectively positioning a slider in a position corresponding to one of the plurality of scroll amount indicators, the slider is being positioned using the cursor control device controlled by the user.

9. The machine-readable medium of claim 8 wherein each of the plurality of scroll amount indicators illustrates a direction of scrolling a document.

10. The machine-readable medium of claim 7 wherein each of the plurality of scroll amount indicators is depicted by one or more arrows illustrating a magnitude of scrolling.

11. The machine-readable medium of claim 7 wherein said method further comprises displaying an animated cue to illustrate a change in the scroll amount.

12. The machine-readable medium of claim 11 wherein displaying an animated cue in said method further comprises:

displaying a finger placed on a scrolling device;

displaying at least a portion of a representation of a document to be scrolled;

displaying a selection of said change in the scroll amount;

displaying a movement of the finger on the scrolling device; and displaying a scrolling of the representation of the document to illustrate how much of the document scrolls upon the movement of the finger, the scrolling amount corresponding to said change in the scroll amount.

13. A data processing system for generating a graphical user interface for display, said graphical user interface to provide functionality of controlling a scroll amount for an on-screen document, said data processing system comprising:

a first means for displaying a representation of a scroll activator to enable the user to activate the scroll function using a cursor control device; and a second means for displaying a plurality of images representing scroll amount indicators, the plurality of images graphically illustrating various magnitudes of scrolling that correspond to a set of distinct scroll amounts, wherein the scroll amount indicators are used for a plurality of application programs and the set of distinct scroll amounts is capable of being configured differently for each of the plurality of application programs.

14. The data processing system of claim 13 wherein the scroll amount represents how much of the on-screen document scrolls when triggered by a user interaction with the cursor control device and wherein said data processing system further comprises:

a third means for displaying one of a plurality of windows on a display, the window including a display area for controlling a scroll function; and a fourth means for selectively positioning a slider in a position corresponding to one of the plurality of scroll amount indicators, the slider is being positioned using the cursor control device controlled by the user.

15. The data processing system of claim 14 wherein each of the plurality of scroll amount indicators illustrates a direction of scrolling a document.

16. The data processing system of claim 13 wherein each of the plurality of scroll amount indicators is depicted by one or more arrows illustrating a magnitude of scrolling.

17. The data processing system of claim 13 further comprising a third means for displaying an animated cue to illustrate a change in the scroll amount.

18. The data processing system of claim 17 wherein the third means further comprises:

a fourth means for displaying a finger placed on a scrolling device;

a fifth means for displaying at least a portion of a representation of a document to be scrolled;

a sixth means for displaying a selection of said change in the scroll amount;

a seventh means for displaying a movement of the finger on the scrolling device; and an eighth means for displaying a scrolling of the representation of the document to illustrate how much of the document scrolls upon the movement of the finger, the scrolling amount corresponding to said change in the scroll amount.

19. A method for providing a coasting function when scrolling an on-screen document, the method comprising:

detecting a user interaction with a scrolling device, the user interaction causing a switch associated with the scrolling device to be in an active position;

determining whether the coasting function is enabled;

scrolling the on-screen document while detecting the user interaction;

detecting that the user interaction ended, the end of the user interaction causing the switch associated with the scrolling device to be reset into an inactive position; and if the coasting function is enabled, continuing to scroll the on-screen document after detecting that the user interaction ended.

20. The method of claim 19 wherein continuing to scroll the on-screen document comprises gradually reducing, over a predetermined time period, a speed of scrolling until the on-screen document no longer scrolls and wherein the scrolling device is disposed on a mouse and the user interaction is rolling a scrolling wheel of the scrolling device.

21. The method of claim 19 further comprising:

detecting that the coasting function is at a lock setting; and continuing to scroll the on-screen document after detecting that the user interaction ended and until receiving a user command to stop scrolling.

22. The method of claim 21 wherein the user command to stop scrolling is triggered by a user tapping the scrolling device.

23. The method of claim 19 further comprising providing a user interface for the coasting function and wherein said continuing to scroll is for a time period specified by a user.

24. The method of claim 23 wherein the user interface provides a slider to enable the user to specify either a time period for the coasting function or a lock setting for the coasting function.

25. The method of claim 23 wherein the user interface further includes an animated cue to illustrate an operation of the coasting function.

26. A machine readable medium having stored thereon executable code which causes a machine to perform a method for providing a coasting function when scrolling an on-screen document, the method comprising:

detecting a user interaction with a scrolling device, the user interaction causing a switch associated with the scrolling device to be in an active position;

determining whether the coasting function is enabled;

scrolling the on-screen document while detecting the user interaction;

detecting that the user interaction ended, the end of the user interaction causing the switch associated with the scrolling device to be reset into an inactive position; and if the coasting function is enabled, continuing to scroll the on-screen document after detecting that the user interaction ended.

27. The machine readable medium of claim 26 wherein continuing to scroll the on-screen document in said method further comprises gradually reducing, over a predetermined time period, a speed of scrolling until the on-screen document no longer scrolls and wherein the scrolling device is disposed on a mouse and the user interaction is rolling a scrolling wheel of the scrolling device.

28. The machine readable medium of claim 26 wherein said method further comprises:

detecting that the coasting function is at a lock setting; and continuing to scroll the on-screen document after detecting that the user interaction ended and until receiving a user command to stop scrolling.

29. The machine readable medium of claim 28 wherein the user command to stop scrolling is triggered by a user tapping the scrolling device.

30. The machine readable medium of claim 26 wherein said method further comprises providing a user interface for the coasting function and wherein said continuing to scroll is for a time period specified by a user.

31. The machine readable medium of claim 30 wherein the user interface provides a slider to enable the user to specify either a time period for the coasting function or a lock setting for the coasting function.

32. The machine readable medium of claim 26 wherein the user interface further includes an animated cue to illustrate an operation of the coasting function.

33. An apparatus for providing a coasting function when scrolling an on-screen document, the apparatus comprising:
- a first means for detecting a user interaction with a scrolling device, the user interaction causing a switch associated with the scrolling device to be in an active position;
- a second means for determining whether the coasting function is enabled;
- a third means for scrolling the on-screen document while detecting the user interaction;
- a fourth means for detecting that the user interaction ended, the end of the user interaction causing the switch associated with the scrolling device to be reset into an inactive position; and
- a fifth means for continuing to scroll the on-screen document after detecting that the user interaction ended, if the coasting function is enabled.

34. The apparatus of claim 33 wherein the fifth means further comprises a sixth means for gradually reducing, over a predetermined time period, a speed of scrolling until the on-screen document no longer scrolls and wherein the scrolling device is disposed on a mouse and the user interaction is rolling a scrolling wheel of the scrolling device.

35. The apparatus of claim 33 further comprising:
- a sixth means for detecting that the coasting function is at a lock setting; and
- a seventh means for continuing to scroll the on-screen document after detecting that the user interaction ended and until receiving a user command to stop scrolling.

36. The apparatus of claim 35 wherein the user command to stop scrolling is triggered by a user tapping the scrolling device.

37. The apparatus of claim 33 further comprising a sixth means for providing a user interface for the coasting function and wherein said continuing to scroll is for a time period specified by a user.

38. The apparatus of claim 37 wherein the user interface provides a slider to enable the user to specify either a time period for the coasting function or a lock setting for the coasting function.

39. The apparatus of claim 37 wherein the user interface further includes an animated cue to illustrate an operation of the coasting function.

40. A method for providing a coasting function displayed by a digital processing system when scrolling an on-screen document, said method comprising:
- detecting a user interaction with a scrolling device which is dedicated to a scrolling function, the user interaction causing a switch associated with the scrolling device to be in an active position;
- determining whether the coasting function is enabled;
- scrolling the on-screen document while detecting the user interaction;
- detecting that the user interaction has ended, the end of the user interaction causing the switch associated with the scrolling device to be reset into an inactive position; and
- if the coasting function is enabled, continuing to scroll the on-screen document after said detecting.

41. A machine readable medium having stored thereon executable code which causes a machine to perform a method for providing a coasting function displayed by a digital processing system when scrolling an on-screen document, said method comprising:
- detecting a user interaction with a scrolling device which is dedicated to a scrolling function, the user interaction causing a switch associated with the scrolling device to be in an active position;
- determining whether the coasting function is enabled;
- scrolling the on-screen document while detecting the user interaction;
- detecting that the user interaction has ended, the end of the user interaction causing the switch associated with the scrolling device to be reset into an inactive position; and
- if the coasting function is enabled, continuing to scroll the on-screen document after said detecting.

42. An apparatus for providing a coasting function when scrolling an on-screen document, the apparatus comprising:
- a first means for detecting a user interaction with a scrolling device which is dedicated to a scrolling function, the user interaction causing a switch associated with the scrolling device to be in an active position;
- a second means for determining whether the coasting function is enabled;
- a third means for scrolling the on-screen document while detecting the user interaction;
- a fourth means for detecting that the user interaction has ended, the end of the user interaction causing the switch associated with the scrolling device to be reset into an inactive position; and
- a fifth means for continuing to scroll the on-screen document after said detecting, if the coasting function is enabled.

* * * * *